United States Patent Office 3,454,080
Patented July 8, 1969

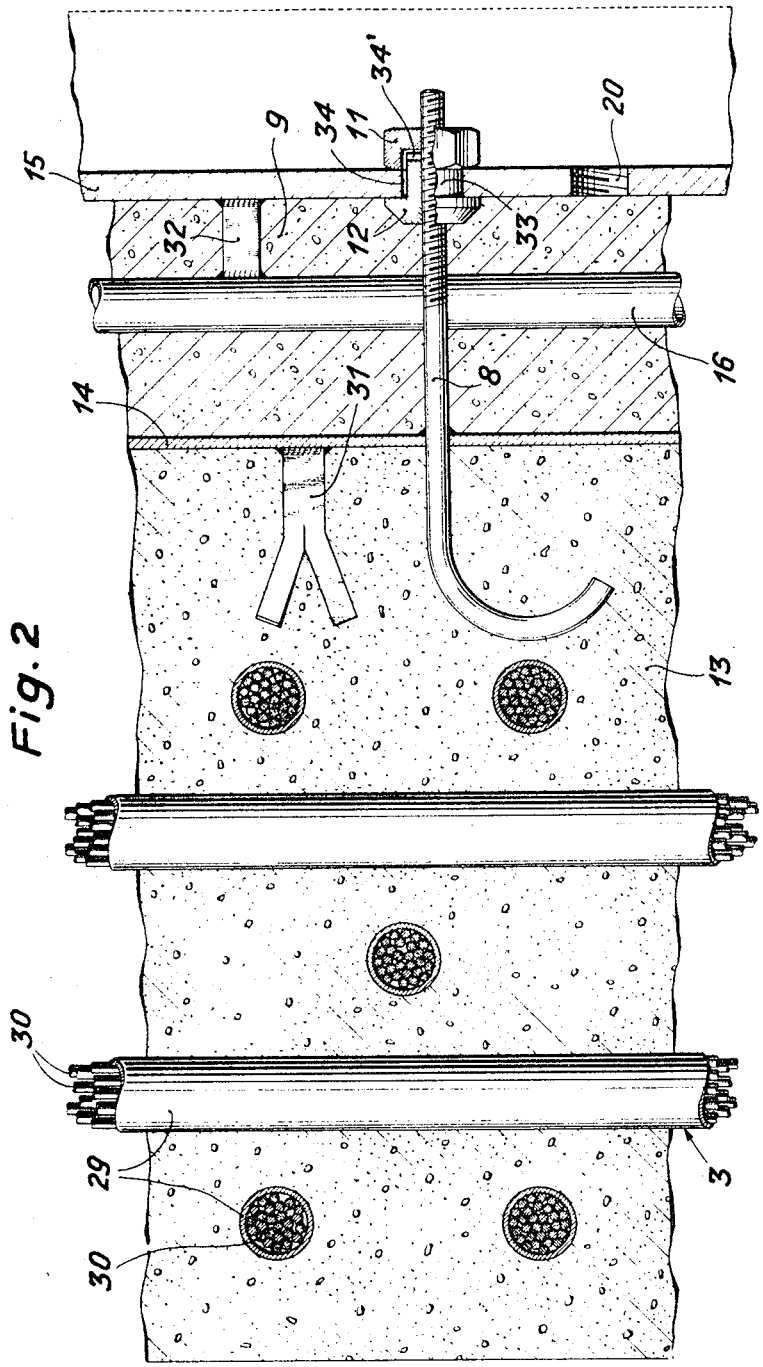

3,454,080
CONCRETE PRESSURE VESSEL AND METHOD OF CONSTRUCTING SAME
Albert Künzli, Wiesendangen, Switzerland, assignor to Sulzer Brothers, Limited, Winterthur, Switzerland, a corporation of Switzerland
Filed Apr. 27, 1966, Ser. No. 545,666
Claims priority, application Switzerland, May 7, 1965, 6,407/65
Int. Cl. G21d; E04b 2/20
U.S. Cl. 165—47      15 Claims

ABSTRACT OF THE DISCLOSURE

The pressure vessel for housing the nuclear reactor is made up of a prestressed concrete outer wall, a steel lining spaced inside the outer wall and a hardened filler material between the outer wall and steel lining which is put in place after prestressing of the outer wall in order to be free of any considerable compressive stress.

---

This invention relates to a concrete pressure vessel. More particularly, this invention relates to a concrete pressure vessel for a nuclear reactor. Still more particularly, this invention relates to a method of constructing a concrete pressure vessel for a nuclear reactor.

Concrete pressure vessels have been known and used in nuclear plants for housing the reactor as well as for serving as heat transfer units. These concrete pressure vessels have been pre-stressed by suitable disposed steel wires or wire ropes so as to avoid imparting any more than a slight tensile stress, if any, to the concrete during operation of the reactor plants. Normally, the pressure vessels have been provided with steel plant linings supported in relation to the concrete walls which have been welded together to provide sealed joints in order to seal the pressure vessels.

However, since concrete experiences a considerably greater elongation in pre-stressing than steel, when the pressure vesels have been designed for elevated internal pressures the steel linings have been subjected to conditions of yield during prestressing operations. Consequently, the danger of detachment of the steel linings from the concrete walls of the pressure vessels with accompaniment of local buckling in the internal or external direction has been present.

Accordingly, it is an object of this invention to provide a pre-stressed concrete pressure vessel having a steel lining wherein the compressive stress in the steel lining is substantially eliminated.

It is another object of this invention to provide a method of constructing a pressure vessel having concrete walls and a steel lining which substantially eliminates compressive stressing of the steel lining during pre-stressing of the concrete walls of the pressure vessels.

It is another object of this invention to provide a concrete pressure vessel having a steel lining and a method of constructing same wherein the stresses in the steel lining during operation of the pressure vessel are reduced as compared to heretofore used pressure vessels.

Generally, the invention provides a pressure vessel for a nuclear reactor made of pre-stressed concrete walls and a steel lining spaced from the pre-stressed walls. The space between the pre-stressed concrete walls and steel lining is filled with a hardened filler material for transmitting compressive forces therethrough. In addition, the steel lining is provided with a plurality of apertures thruogh which the filler material is inserted into the space between the pre-stressed concrete walls and steel lining and a plurality of sealing means for sealing the apertures after insertion of the filler material.

The method provided by the invention of constructing the pressure vessel comprises the steps of forming a concrete wall having a plurality of pre-stressing means therein, positioning a steel lining in spaced relation to the formed concrete wall, thereafter pre-stressing the concrete wall after at least partial setting of the concrete of the wall, and subsequently filling the space between the pre-stressed concrete wall and steel lining with filler material capable of hardening to provide for transmission of pressure therethrough.

These and other objects and advantages of the invention will become more apparent from the following detailed description and appended claims taken in conjunction with the accompanying drawings in which:

FIG. 2 illustrates an enlarged detail of the securement of the steel lining to a concrete wall;

Figure 1:
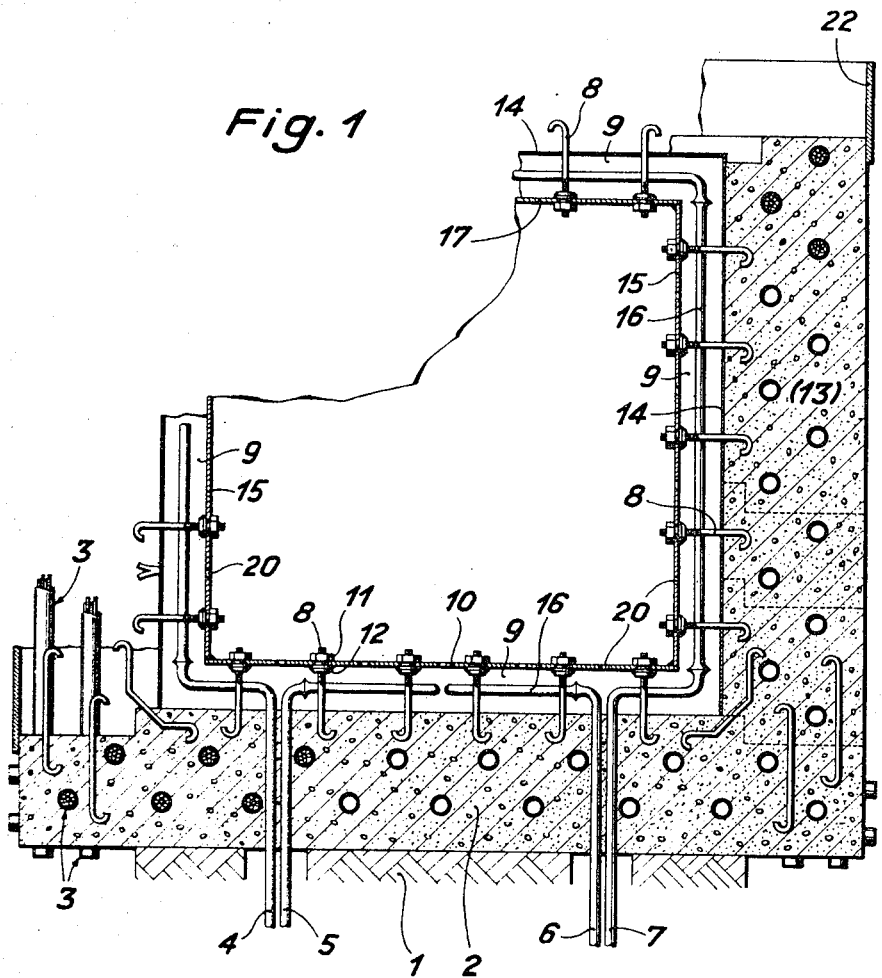
FIG. 1 illustrates a vertical section of a pressure vessel having a cylindrical side wall during construction according to the invention.

Referring to FIG. 1, in the construction of a concrete pressure vessel a floor 2 with pre-stressing elements 3 such as steel wires or steel ropes installed in pipes embedded in the concrete is initially constructed on a base 1. In addition, connecting pipes 4, 5, 6, 7 are secured in the floor 2 for the purpose of being subsequently connected to cooling pipes 16 for cooling the wall of the vessel. Also, spacer screws 8 having threaded ends are secured in the floor for subsequent securement of a floor plate 10 of a steel lining thereto. Next, the cooling pipes 16 are connected to the connecting pipes and the floor plate is secured on the spacer screws 8 over the cooling pipes 16 by means of threaded nuts 11, 12. A space 9 is thus created between the floor plate 10 and the floor 2.

After the floor plate 10 is secured on the floor 2, a side section 15, which may be cylindrical, is erected on and welded to the floor plate 10. Subsequently, the cooling pipes 16 which are suitably welded to the connecting pipes 4 and 7, are secured on the side section 15 of the lining. The associated spacer screws 8 are then mounted on the side section 15 and a relatively thin metal skin 14 which limits the space 9 between the lining of the concrete wall 13 and at the same time represents a form of investment shuttering is secured thereto. The side wall 13 can then be erected from outside with the aid of moving shuttering 22 which may consist substantially of a ring of steel plate. During concreting, pre-stressing elements 3 are concreted into the side wall 13 in the same way as into the floor 2; the dotted lines in the drawing indicating some phases of the concreting process.

The roof section 17 of the lining can be mounted as soon as the side wall 13 is completed. This roof section is also provided with spacer screws 8 which carry the upper plate skin 14. Before the plate skin is mounted the necessary cooling pipes 16 are disposed and secured to the roof section 17 in the space 9 between the lining and the plate skin. After the upper plate skin 14 has been completed in the form of investment shuttering, the roof which is not shown as completed in the drawing may then be concreted. However, it is also possible to install the roof section 17 of the lining before the side wall 13 is concreted.

The pressure vessel is pre-stressed by the pre-stressing elements 3 as soon as the concrete is completely or substantially set and no further significant shrinkage is to be expected. Prior to and immediately after solidification of the concrete, the nuts 11 and 12 which retain the lining will have been released. After the pre-stressing of the concrete vessel is completed the nuts 11 and 12 are re-tightened and the space 9 located between the concrete wall and the lining is filled with filler material 21 through openings 20 in the lining.

The openings 20 in the lining are closed in each case after the corresponding part of the space is filled the closure being effected, for example, by screwing in of plugs which are then welded to the material of the lining to produce a gas-tight joint. The nuts 11 may also be welded to the material of the lining and to the threads of the spacer screws 8 so as to produce a gas-tight joint. It is, however, also possible to invert cup-shaped components over the nuts 11 and to weld the aforementioned cup-shaped components to the lining.

A material capable of hardening and capable of transmitting pressure is used as the filler material. The material most suitable for this purpose is concrete but of a consistency which will normally be different from the consistency of the wall in order that the filler material be sufficiently fluid to properly fill the space and enclose the parts disposed therein by pouring. In this regard, it is noted that there is no possibility of ramming or vibrating of the filler material.

It is also possible to add to the concrete which acts as the filler material some other material in powder form or in the form of small pieces to increase the radiation absorption capacity of the concrete. It is also possible to employ other materials capable of hardening, for example, those employed in the production of precision castings.

Referring to FIG. 2, the pre-stressing elements 3 which incorporate pipes 29 through which steel wires 30 are drawn are disposed in the wall 13. The steel wires 30 are provided at their ends with conventional means for permitting controllable stressing, for example, nuts and threaded components. The plate skin 14 which limits the side wall 13 in relation to the space 9 is secured with wall anchors 31 in the concrete of the wall and the cooling pipes 16 are supported by the lining 15 with the aid of webs 32. The lining 15 is joined to the wall 13 through the previously mentioned spacer screws 8 and the nuts 11 and 12 threaded thereon. As shown, the spacer screws 8 are welded to the material of the plate skin 14 to provide the initial securement of the plate skin 14 on the spacer screws 8 during concreting. The opening 20 which serves for the filling of the space 9 between the lining 15 and the plate skin 14 is provided with a thread. After filling the filling material into the space 9 of the effected part, a plug is screwed into this thread and subsequently welded to the lining with a gas-tight seam. It is noted that the dotted line on the right-hand edge of FIG. 2 indicates the boundary of thermal insulation which is normally fitted.

As shown, the nut 12 is so constructed that it contains a part which is accessible from the interior space of the lining with contact surfaces for a tool so that the nut 12 can be adjusted from inside. In the example shown, the nut 12 is provided with a projection 33 which extends through a hole 34 of corresponding size in the lining 15. The projection 33 is provided with a slot 34' into which a suitably formed tool, for example, a screwdriver, can engage. The projection 33 is encompassed within a recess of the nut 11 which faces the interior space of the lining. Other embodiments of these nuts are of course also possible.

Because of the heretofore described design of the nuts 11 and 12 can be tightened or slackened from the inside during the construction of the pressure vessel. This is advantageous since the final mounting of the lining with the aid of the spacer screws 8 takes place immediately before filling of the space 9, that is, after completed setting and pre-stressing of the concrete of the external walls of the pressure vessel.

The method of operation of the invention is shown graphically in the graphs of FIGS. 3 and 4; arrows which indicate the magnitude of the stresses resulting from various effects being allocated to one scale. In FIG. 3 the conditions in a pressure vessel constructed in accordance with previous manufacturing methods, that is, with the lining mounted directly in the concrete are indicated. In FIG. 4 the conditions which occur with a pressure vessel constructed in accordance with the invention are indicated. The graphs $a$ refer to normal operation and the graphs $b$ to the operation during pressure loss when the lining is particularly endangered.

Figures 3A, 3B:
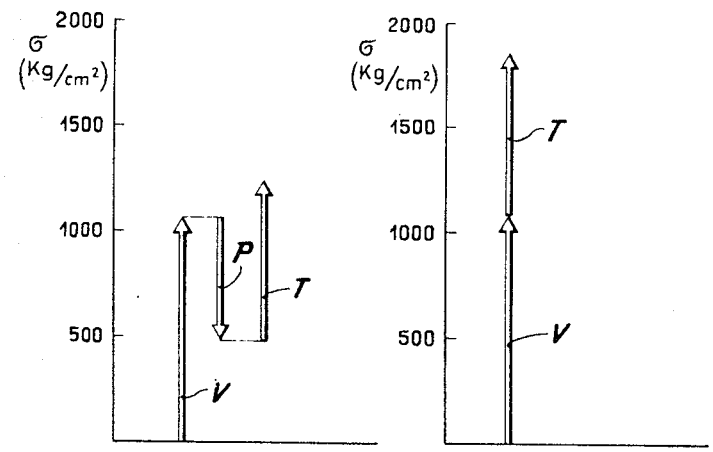
FIGS. 3a and 3b illustrate graphically the pressures in a steel lining of a conventional pressure vessel.

In the graphs of FIG. 3 the arrows V represent the magnitude of the compressive stress which is created in the steel lining as the result of the shrinkage of the concrete and the pre-stress due to the wires. The arrows T represent the increase of compressive stress in the material of the lining due to the operating temperature of the reactor. The arrow P which points in the opposite direction from arrows V and T represents the reduction in compressive stress resulting from the positive pressure which prevails in the interior of the pressure vessel during operation. The conditions are as indicated by the sequence of the arrows in the FIG. 3a, that is, when the plant is brought into operation the pressure vessel is first pressurised after which the temperature is increased. As can be seen from this graph the stress which normally occurs in the lining during operation as indicated by the end of the arrow T, is very high. However, in the case of a pressure loss during operation a much higher stress occurs as indicated in FIG. 3b by the upper end of arrow T since the favorable pressure effect disappears. In such a case the compressive stress in the lining would be inpermissibly high and result in buckling or detaching from the concrete wall. Accordingly, the design of previously used pressure vessels had to allow for this condition.

The graphs in FIG. 4 represent the conditions in a pressure vessel constructed in accordance with the invention. Since the filling between the lining and the concrete wall of the vessel is constructed only after partial setting and pre-stressing there is at most a slight compressive stress, as indicated by the arrow $V_1$, in the lining when this is a static condition since it is, in fact, possible for a final shrinkage of the concrete of the concrete walls to take place after the space between the lining and the concrete walls has been filled. The shrinkage is a process which extends over prolonged period so that it is not normally possible to await the end of the shrinkage process.

Figures 4A, 4B:
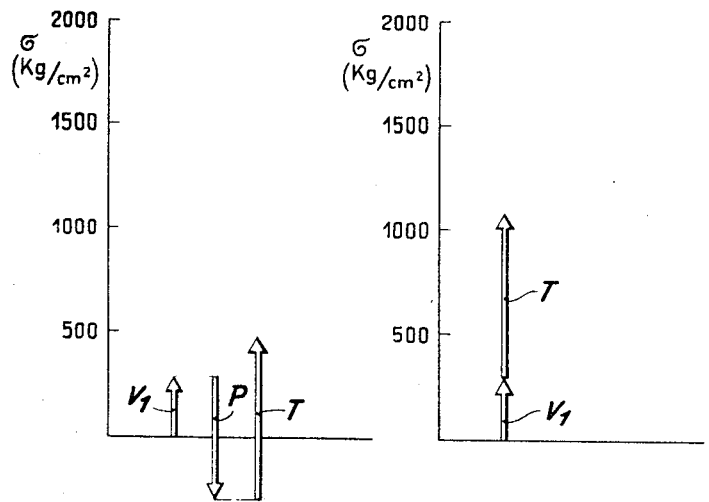
FIGS. 4a and 4b illustrate graphically the pressures in the steel lining of a pressure vessel according to the invention.

The arrow T once again indicates the compressive stress in the material of the lining resulting from the effect of the operating temperature. This stress is counteracted by a stress relief obtained from the operating pressure of the vessel as indicated by the arrow P. As can be seen, the operating compressive stress indicated by the end of the arrow T in the graph of FIG. 4a is very low. However, even the stress which could result in the event of pressure failure at operating temperature as represented by the end of arrow T in FIG. 4b is not so high as to have detrimental effects. For example, should it be possible to adopt a special construction for the concrete of the concrete walls to avoid final shrinkage, the compressive stress represented in the graphs $a$ and $b$ of FIG. 4 the arrows $V_1$ would be eliminated and the maximum compressive stress which could occur in the lining would be further reduced.

In the concrete pressure vessel according to the invention it is possible for the magnitude of the pre-stressing elements 3 to be adapted to the operating condition of the pressure vessel. For example, it is possible to adjust the parts such as screws and nuts which are provided to exert the pre-stressing force on the wires 30 in accordance with the temperature and pressure condition of the pressure vessel. Also, in a relatively simple manner, it is possible to avoid the high pressure peaks in the structural parts of the pressure vessel by varying the temperature to alter the force exerted by the pre-stressing wires. For example, by imparting a higher temperature to the wires 30 to cause elongation the pre-stressing force is reduced. Conversely, it is possible to cool the wires to increase the pre-stressed force. The change of temperature may be obtained by altering the cooling effect of the cooling pipes 16; however, an electric heating system may also be provided for the wires 30 to obtain more rapid temperature changes. The temperature change may also be made dependent in the form of a control of a regulating variable of the reactor, as for example, a temperature or a pressure. It is however, also possible to obtain this change in the form of a regulation and to provide the pressure vessel for this purpose with one or more strain gauges, whose measuring signals suitably influence the pre-stressing elements.

Having thus described the incention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A pressure vessel for a nuclear reactor having a load carrying concrete wall for defining a chamber for the nuclear reactor, prestressing means within said concrete wall subjecting said concrete wall to a compressive stress; a steel lining in spaced relation to said concrete wall on the side of the chamber, said lining being free of said compressive stress; and a poured and hardened filler material between said concrete wall and said lining, said filler material being substantially free of compressive stress while being capable of transmitting pressure between said lining and said prestressed concrete wall whereby prior to operation of the nuclear reactor said lining is free of compressive stresses.

2. A pressure vessel as set forth in claim 1 which further comprises a plate skin secured to said concrete wall between said filler material and said concrete wall.

3. A pressure vessel as set forth in claim 2 which further comprises a plurality of spacer means adjustably secured to said steel lining and permanently secured to said plate skin, each of said spacer means having an end embedded in said concrete wall whereby upon adjustment of said spacer means said lining is relieved of compressive stress after prestressing of said concrete wall.

4. A pressure vessel as set forth in claim 3 wherein each of said spacer means includes a threaded spacer screw 8 and a pair of threaded nuts thereon, said pair of threaded nuts being disposed on opposite sides of said lining for retaining said lining therebetween.

5. A pressure vessel as set forth in claim 4 wherein the nut disposed on the side of said lining opposed to said wall includes a part projecting through said lining and having a tool engageable surface thereon.

6. A pressure vessel as set forth in claim 1 which further comprises a plurality of cooling pipes disposed between said wall and said lining for cooling the pressure vessel.

7. A pressure vessel as set forth in claim 6 wherein said cooling pipes are secured in spaced relation to said lining.

8. A pressure vessel as set forth in claim 1 wherein said lining includes a plurality of openings for the insertion of said filler materials.

9. A pressure vessel as set forth in claim 1 wherein said filler material is concrete having a fluid consistency different from the initial consistency of the concrete of said load carrying wall whereby the filler material can substantially completely fill the space between said lining and said wall.

10. A method of constructing a concrete pressure vessel which comprises the steps of forming a concrete wall having a plurality of pre-stressing means therein, positioning a steel lining in spaced relation to the formed concrete wall, thereafter pre-stressing the formed concrete wall after at least partial setting of the concrete in the wall, and subsequently filling the space between the lining and the wall with a hardenable filler material for transmission of pressure therethrough.

11. A method as set forth in claim 10 wherein the step of positioning the steel lining precedes the step of forming the concrete wall whereby the steel lining serves to support at least the inner shuttering of the concrete wall.

12. A method as set forth in claim 11 which further comprises the step of attaching a plate skin in spaced relation to the lining prior to the step of forming the concrete wall whereby the plate skin abuts the concrete wall to form investment shuttering in the pressure vessel.

13. A method as set forth in claim 10 wherein said step of filling includes insertion of the filler material through apertures in the steel lining.

14. A method as set forth in claim 13 which further comprises the step of sealing the apertures in the steel lining after insertion of the filling material to form a gas tight seal.

15. A method as set forth in claim 12 which further comprises the steps of disposing a plurality of connecting pipes in the concrete wall during formation thereof and disposing a plurality of cooling pipes in connection with the connection pipes and the steel lining subsequent to the step of positioning the steel lining and prior to the step of attaching the plate skin.

References Cited

UNITED STATES PATENTS

| | | | |
|---|---|---|---|
| 1,303,667 | 5/1919 | Holmgreen | 52—249 X |
| 1,944,787 | 1/1934 | Dusablon | 52—365 |
| 3,088,890 | 5/1963 | Kratz | 176—87 X |
| 3,258,403 | 6/1966 | Malay | 176—37 |
| 3,260,020 | 7/1966 | Patin | 220—13 X |
| 3,175,958 | 3/1965 | Bourgade | 176—87 |

FOREIGN PATENTS

| | | |
|---|---|---|
| 936,198 | 9/1963 | Great Britain. |
| 997,882 | 7/1965 | Great Britain. |
| 1,017,365 | 1/1966 | Great Britain. |
| 1,323,737 | 3/1963 | France. |
| 1,353,275 | 1/1964 | France. |
| 800,388 | 8/1958 | Great Britain. |

ROBERT A. O'LEARY, *Primary Examiner.*

ALBERT W. DAVIS, JR., *Assistant Examiner.*

U.S. Cl. X.R.

52—269, 249, 365, 405, 612, 743; 165—136; 176—87